United States Patent [19]
Paro

[11] Patent Number: 5,794,564
[45] Date of Patent: Aug. 18, 1998

[54] APPARATUS FOR PREVENTING INSECTS FROM ACCESSING ANIMAL FEEDING CONTAINERS AND METHODS OF MAKING AND USING THE SAME THEREOF

[76] Inventor: Daniel C. Paro, 100 Country Cove, Warner Robins, Ga. 31088

[21] Appl. No.: 735,030

[22] Filed: Oct. 22, 1996

[51] Int. Cl.$^6$ .................................................. A01K 5/01
[52] U.S. Cl. .................................................. 119/61
[58] Field of Search .................... 119/61, 51.5; D30/129, D30/130

[56] References Cited

U.S. PATENT DOCUMENTS

| | | | |
|---|---|---|---|
| 2,191,811 | 2/1940 | Trampier | 119/51 |
| 3,901,192 | 8/1975 | Adams | 119/51 R |
| 4,128,080 | 12/1978 | Haney | 119/51.5 |
| 4,896,627 | 1/1990 | Riddell | 119/51.5 |
| 4,907,539 | 3/1990 | Abulhasan | 119/52.1 |
| 4,953,506 | 9/1990 | Sanders | 119/61 |
| 4,966,099 | 10/1990 | Arney | 119/61 |
| 4,981,108 | 1/1991 | Faeroe | 119/61 |
| 5,031,575 | 7/1991 | Phillips | 119/61 |
| 5,069,166 | 12/1991 | Ahuna | 119/61 |
| 5,069,167 | 12/1991 | Kasselman | 119/61 |
| 5,113,798 | 5/1992 | Rera | 119/61 |
| 5,117,778 | 6/1992 | Imamura | 119/51.5 |
| 5,125,363 | 6/1992 | McGaha | 119/61 X |
| 5,165,365 | 11/1992 | Thompson | 119/61 |
| 5,205,242 | 4/1993 | Kasselman | 119/61 |
| 5,245,948 | 9/1993 | McClellan | 119/51.5 |
| 5,253,609 | 10/1993 | Partelow et al. | 119/61 |
| 5,277,149 | 1/1994 | East | 119/61 X |
| 5,467,738 | 11/1995 | Cass | 119/61 |

*Primary Examiner*—Thomas Price
*Attorney, Agent, or Firm*—Steven Lin

[57] ABSTRACT

An apparatus 10 adapted to receive, hold, and support conventional animal feeding container(s) 60 such as dishes, bowls, etc. wherein the apparatus 10 prevents insects from accessing the animal feeding container(s) 60. The apparatus 10 has an upper component 20 adapted to receive and support the animal feeding container(s) 60, a lower component 40 that functions as a base or foundation and as a moat to prevent insects from accessing the upper component 20, and a support component 30 located between the upper component 20 and lower component 40 for supporting the upper component 20 generally over the lower component 30. The lower component 40 has a splash guard lip 46 that covers a portion of the top of the inner retaining or reservoir area 42 to prevent liquid or fluid 43 from splashing or spilling out of the retaining or reservoir area 42 especially if the apparatus 10 is moved, bumped, kicked, etc. Furthermore, the largest outer perimeter of the upper component 20 is made to be smaller than and entirely surrounded by the largest outer perimeter of the lower component 40 so that the upper component 20 is prevented from being in contact with a vertical surface or wall 70. The retaining or reservoir area 42 is made to have a large capacity for holding a relatively large quantity of liquid or fluid 43 so that it does not have to be re-filled as periodically or frequently. Apparatus 10 also has a non-skid mat placed on top of the bottom surface 24 of upper component 20 so that the feeding container(s) 60 does/do not slide or move around within the upper component or tray 20, especially if the apparatus 10 is moved, bumped, kicked, etc. The lower component 40 has handles 50 at its sides to allow a person to more easily lift or move the apparatus 10 to a desired location.

24 Claims, 2 Drawing Sheets

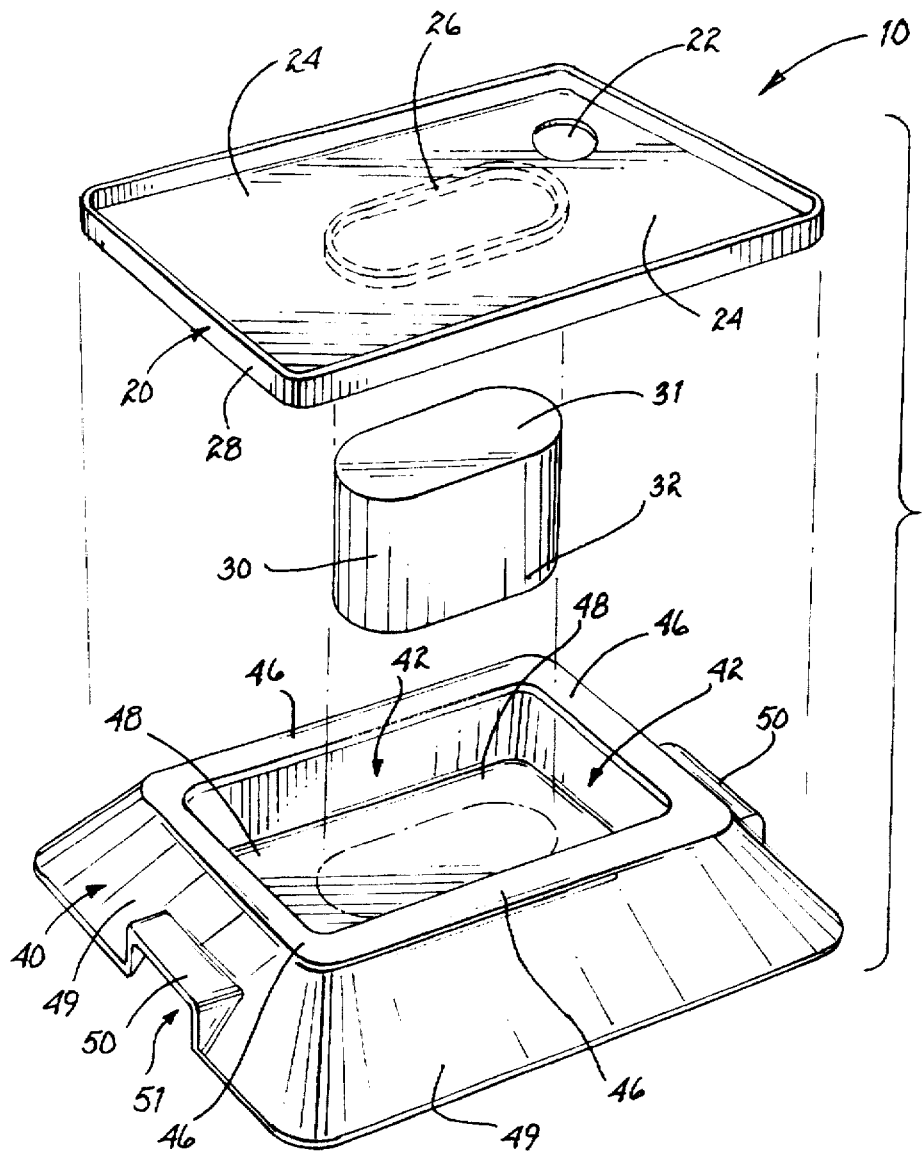
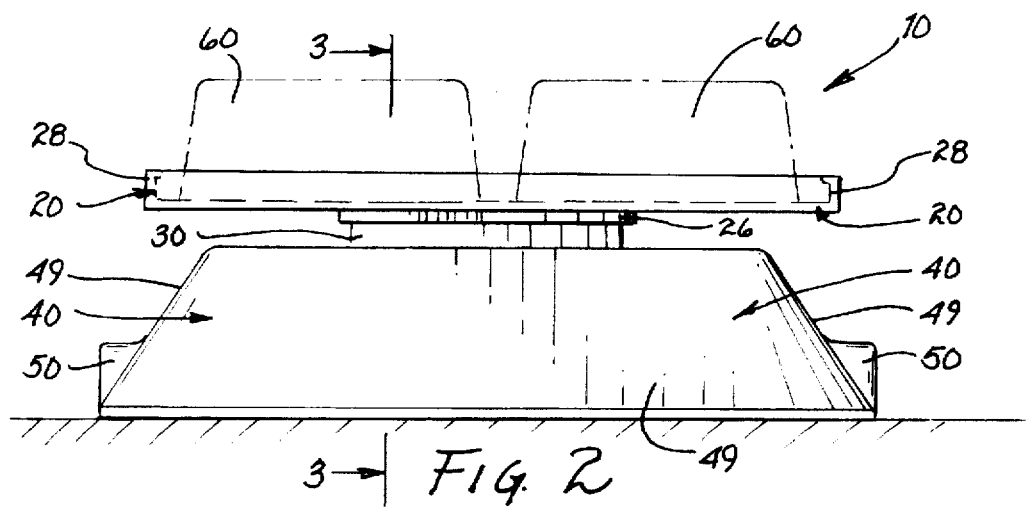

APPARATUS FOR PREVENTING INSECTS FROM ACCESSING ANIMAL FEEDING CONTAINERS AND METHODS OF MAKING AND USING THE SAME THEREOF

BACKGROUND OF THE INVENTION

1. Fields of the Invention

The present invention relates to an apparatus for preventing insects from accessing objects used by animals, and, more particularly, relates to an apparatus for preventing insects from accessing animal feeding containers and corresponding methods of making and using the same.

2. Discussion Of Background And Prior Art

The use of conventional dishes or bowls to provide food or water to animals or pets has the associated problem of insects accessing these dishes or bowls and infesting or contaminating the food or water in the dishes or bowls. A number of different animal or pet feeding dishes or bowls that are designed to aid in preventing or retarding the access of insects to the food or water have been developed.

For example, an apparatus with an upper section that has a number of compartments or that has a number of apertures in which a specifically shaped and designed dish is held in each aperture therein for holding food or water and with a lower dish that has a liquid reservoir for preventing insects from reaching the upper section with the compartments or dishes is taught by the prior art. U.S. Pat. No. 5,467,738 to Cass provides an example of such an apparatus. Furthermore, there are a number of examples and types of dishes or bowls that have been specifically configured and designed for preventing insects from reaching food or water provided for animals. Some examples of these types of dishes or bowls are provided in U.S. Pat. Nos. 4,128,080 to Haney, 4,896,627 to Riddell, 5,069,166 to Ahuna, 5,031,575 to Phillips, 5,277,149 to East, 5,245,948 to McClellan, 5,125,363 to McGaha, 5,117,778 to Imamura, 5,113,798 to Rera, 2,191,811 to Trampier, 5,069,167 to Kasselman, 4,981,108 to Faeroe.

One main problem, however, with the above prior art devices is that they are themselves dishes or bowls designed to prevent access from insects or they have specifically designed dishes, bowls, or compartments that are used with the apparatuses that are designed to prevent access from insects that replace an owner's conventional animal feeding dish(es) or bowl(s). If a pet owner decides to use one of the prior art insect access prevention apparatuses, then he or she will no longer have a need or any use for the conventional animal feeding dish(es) or bowl(s) that they already own. Furthermore, if the pet owner wants or needs to replace the insect access prevention apparatus, then the pet owner has to replace the entire apparatus with a new insect access prevention apparatus. Therefore, there is waste and lack of flexibility for the pet owners in using these prior art insect access prevention devices.

Additionally, the prior art insect access prevention also have the problem of the liquid splashing or spilling out of the reservoir of these devices if these devices are moved, bumped, kicked, etc. Another problem with these prior art insect access prevention devices is that the upper section of these apparatuses may have an upper section, dish, or bowl that when contacted against a vertical surface or wall, insects would still be able to crawl or move on the vertical surface or wall and into the upper section of the device and still access the food or water placed on the device. A further problem with the prior art devices is that the retaining area for the liquid that prevents the insect access (i.e. the moat area, etc.) typically holds an amount of liquid such that it may evaporate relatively often, and, therefore, the retaining area has to be periodically re-filled by the pet owner on a periodic or frequent basis. Also, if an apparatus that is adapted to receive presently existing animal feeding dishes or bowls were developed and made, then the apparatus also needs to be able to secure or stabilize these dishes or bowls (i.e. prevent movement, sliding, etc. of these dishes or bowls) when they are placed on the apparatus.

There exists the need to continue to develop new and improved insect access prevention apparatuses or devices which has advantages over the prior art devices. Therefore, an insect access prevention apparatus that is able or adapted to receive presently existing conventional animal feeding dishes, bowls, device, etc. does not presently exist. Furthermore, an insect access prevention apparatus that helps prevent the splashing or spilling of liquid out of the reservoir (i.e. moat area, etc.) of the apparatus if these devices are moved, bumped, kicked, etc., that prevents the upper section of these apparatus where the food or water is placed from contacting a vertical surface or wall so that insects would not be able to access the upper component and feeding container(s) and that has a relatively large liquid retaining area (i.e. the moat area, etc.) for holding a relatively large amount of liquid so that the retaining area does not have to be re-filled as periodically, does not exist. Therefore, an insect access prevention apparatus or device that overcomes these disadvantages is desired, and it is an object of the present invention to overcome the problems and limitations of the background art that has been discussed.

SUMMARY OF THE INVENTION

Set forth is a brief summary of the invention in order to solve the foregoing problems and achieve the foregoing and other objects, benefits, and advantages in accordance with the purposes of the present invention as embodied and broadly described herein.

Accordingly, it is an object and advantage of the present invention to provide an apparatus for preventing insects from accessing at least one animal feeding container that includes an upper component adapted to receive and support the at least one animal feeding container, a support component having a top end and a bottom end wherein the top end of the support component is attached to the upper component, and a lower component attached to the bottom end of the support component wherein the lower component has at least a retaining area for holding a liquid that prevents insects from accessing the upper component and the at least one animal feeding container supported by the at least one upper component.

One aspect and advantage of the present invention is to provide an apparatus for preventing insects from accessing at least one animal feeding container wherein the upper component of the apparatus is a tray that is adapted to receive and support the at least one animal feeding container.

It is a further aspect and advantage of the present invention to provide a non-skid mat that is located on a top side of the tray for preventing movement or sliding of the at least one animal feeding container that is received and supported by the upper component.

It is a further aspect and advantage of the present invention to provide a splash guard lip located around a perimeter of the top portion of the retaining area of the lower component to help prevent liquid from splashing out of the retaining area when the apparatus is moved or transported.

It is a further aspect and advantage of the present invention to provide a retaining area (i.e. moat area, etc.) that has a large capacity for holding a relatively large quantity of liquid.

It is a further aspect and advantage of the present invention to provide an upper component having a largest outer perimeter and the lower component having a largest outer perimeter wherein the largest outer perimeter of the upper component is at least smaller than and entirely surrounded by the largest outer perimeter of the lower component so that the upper component is prevented from contacting vertical surfaces or walls when the apparatus is placed on a ground surface near vertical surfaces or walls.

Another object and advantage of the present invention is to provide a method of making an apparatus for preventing insects from accessing at least one animal feeding container that includes the steps of providing an upper component adapted to receive and support the at least one animal feeding container, attaching a top end of a support component to the upper component, and attaching a bottom end of the support component to a lower component having at least a retaining area for holding a liquid that prevents insects from accessing the upper component and the at least one animal feeding container supported by the at least one upper component.

Another object and advantage of the present invention is to provide a method of using an apparatus for preventing insects from accessing at least one animal feeding container that includes the steps of providing the apparatus with an upper component adapted to receive and support the at least one animal feeding container, a support component having a top end and a bottom end wherein the top end of the support component is attached to the upper component, and a lower component attached to the bottom end of the support component wherein the lower component has at least a retaining area, placing the at least one animal feeding container on the upper component, and filling liquid into the retainer area of the lower component so that insects are prevented from accessing the upper component and the at least one animal feeding container supported by the at least one upper component.

Another object and advantage of the present invention is to provide an apparatus for preventing insects from accessing at least one object used by animals that includes at least one upper component adapted to receive and support the at least one object used by the animals, at least one support component wherein each of the at least one support component has a top end and a bottom end and wherein the top end of each of the at least one support component is attached to the at least one upper component, and at least one lower component attached to the bottom end of each of the at least one support column wherein each of the at least one lower component has at least a retaining area for holding a liquid that prevents insects from accessing each of the at least one upper component and each of the at least one object used by the animals supported by each of the at least one upper component.

BRIEF DESCRIPTION OF THE DRAWINGS

FIG. 1 Exploded perspective view of a preferred embodiment of the present apparatus for preventing insects from accessing at least one animal feeding container.

FIG. 2 Side view of the preferred embodiment apparatus for preventing insects from accessing at least one animal feeding container of FIG. 1 wherein the apparatus is adapted to receive and support at least one feeding container.

DETAILED DESCRIPTION OF THE PREFERRED EMBODIMENT

The present invention generally discloses an apparatus 10 for preventing insects (i.e. including but not limited to ants, bugs, roaches, crickets, etc.) from accessing one or more feeding container(s) 60 or any other animal/pet devices or objects used by animals. The feeding container(s) 60 are bowls, dishes, or any other type of receptacle for holding animal or pet food or water. These feeding container(s) 60 can be of the conventional type. As shown in FIGS. 1–4, the apparatus 10 generally has an upper component 20, a support component 30, and a lower component 40. The upper component 20, support component 30, and lower component 40 can be made of plastic, wood, metal, or any other suitable material.

Figure 3:
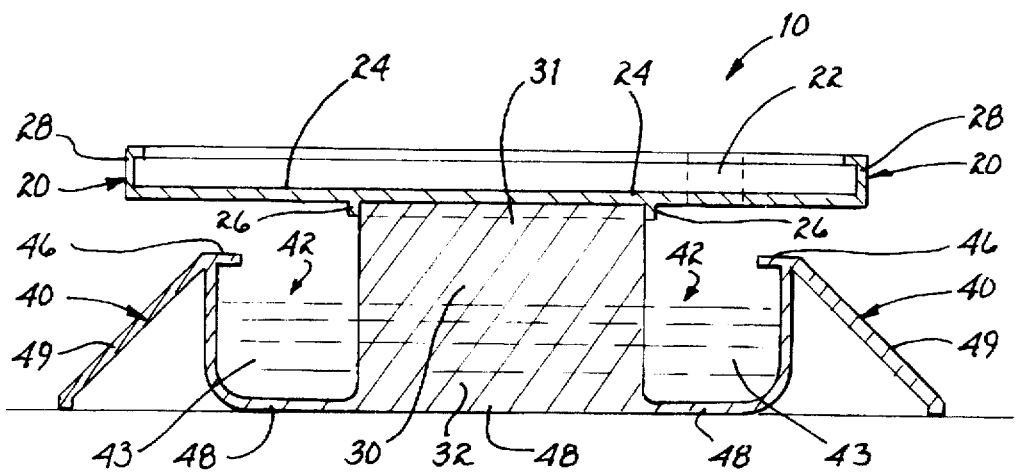
FIG. 3 Cross-sectional side view of the preferred embodiment apparatus for preventing insects from accessing at least one animal feeding container according to the line 3—3 of FIG. 2.
Figure 4:
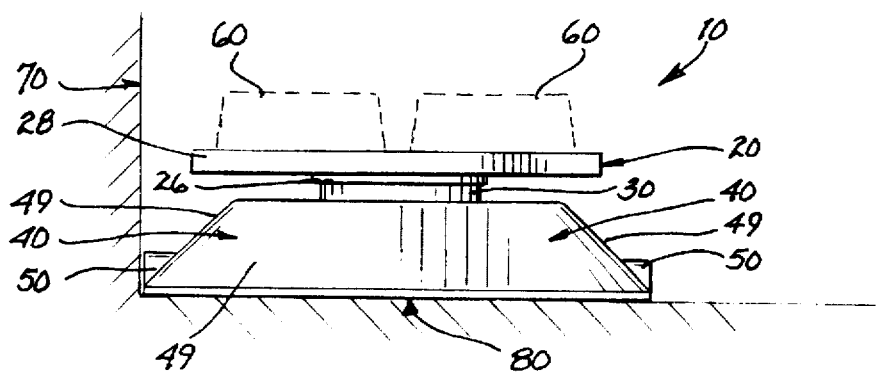
FIG. 4 Side view of the preferred embodiment apparatus for preventing insects from accessing at least one animal feeding container of FIG. 1 wherein the apparatus is shown on a ground surface and near a vertical surface.

In FIGS. 1–5, the upper component 20 is basically a tray (i.e. tray 20). The tray 20 is adapted to receive and support (i.e. including but not limited to removably receive and support) the feeding container(s) 60, which include but are not limited to animal or pet bowls, dishes, receptacles, etc. and which are shown in dotted lines in the figures. The tray 20 receives, supports, and retains the container(s) 60 on the apparatus 10 as shown in FIGS. 2 and 4. The tray 20 has a flat bottom surface 24 and a retaining lip 28 around the perimeter of the bottom surface 24 to define the outer edge of the tray 20. The tray 20 also has a lip area 26 at its bottom surface to receive the support component 30, and the inner perimeter of this lip area 26 is shaped to fit around the top end 31 of support component 30 to stabilize and further retain the tray 20 onto the support component 30. However, the upper component 20 is not limited to a tray, and any suitable component that can receive, hold, and support an animal feeding container(s) 60 may be utilized for carrying out the purpose of the present invention.

The support component 30 is generally a column structure that provides support for the upper component 20. FIGS. 1 and 3 show that the support component 30 is an oval-shaped, column structure, but component 30 can also be of any other suitable shape or design. Support component 30 has a top end 31 and a bottom end 32. The support component 30 functions to support the upper component 20 generally over the lower component 40. However, the support component 30 is not limited to a column structure, and any suitable component that can support the upper component 20 generally over the lower component 40 may be utilized for carrying out the purpose of the present invention.

The lower component 40 is a structure that functions as a base or foundation for the apparatus 10. FIGS. 1–4 show that the lower component 40 is generally a base or foundation structure with a bottom surface 48 and upwardly and inwardly sloping outer surfaces 49 (i.e. similar in shape to the base or bottom of a pyramid). The lower component 40 also has an interior area 42 for retaining a liquid or fluid 43.

Any suitable liquid or fluid such as water, etc. may be used for filling into the retaining or reservoir area 42 so long as the liquid or fluid 43 used is able to prevent insects from accessing the upper component 20 and feeding container(s) 60. Therefore, the lower component 40 with liquid or fluid 43 in the interior area 42 functions as a moat to prevent insects from accessing or crawling to the upper component 20 and the animal feeding container(s) 60 supported by the upper component 20. However, the lower component 30 is not limited to a base or foundation structure with a bottom surface 48 and upwardly and inwardly sloping outer surfaces 49, and any suitable component that can function as a base or foundation for the apparatus 10 and hold or retain a liquid to function as a moat to prevent insects from accessing the upper component 20 and the feeding container(s) 60 may be utilized for carrying out the purpose of the present invention.

As shown in FIGS. 1 and 3, the bottom end 32 of the support component or column 30 is generally attached at a middle portion or central area of the bottom surface 48 of the lower component or base 40. Support component 30 can either be integrally attached as shown in FIG. 3 or separately attached (i.e. not shown) to the lower component or base 40. The upper component or tray 20 is then placed on the top end 31 of the support component or column 30, and the lip area 26 of the upper component or tray 20 fits over and around (i.e. fittingly surrounds) the perimeter of the top end 31 of the support component or column 30. The upper component or tray 20 is placed on the support column 30 such that it is generally over and not in contact with the lower component 40. However, column 30 is not limited to being attached to lower component 40 at a middle or central area of the bottom surface 48, and any suitable way of attaching the column 30 to the lower component 40 so that the upper component 20 is generally over and not in contact with the lower component 40 may be utilized for carrying out the purposes of this invention. The upper component or tray 20 can also be further secured to the support component or column 30 with the use of securing components such as screws, nails, adhesive, etc.

As shown in FIGS. 1 and 3, the lower component or base 40 further has a splash guard lip 46 that is located or attached around a perimeter of a top portion of the inner retaining or reservoir area 42. The splash guard lip 46 covers a portion of the top of the inner retaining or reservoir area 42 as shown in FIGS. 1 and 3. The splash guard lip 46 helps prevent liquid or fluid 43 from splashing or spilling out of the retaining or reservoir area 42 especially if the apparatus 10 is being moved or transported or if the apparatus 10 is accidentally or inadvertently bumped, kicked, etc. However, the lower component 40 is not limited to use with a splash guard lip, and any suitable component that can function as a guard to help prevent liquid or fluid 43 from splashing or spilling out of the retaining or reservoir area 42 may be utilized for carrying out the purpose of the present invention.

Referring to FIGS. 1–4, upper component or tray 20 has a largest outer perimeter that would be generally equivalent to the perimeter of the tray, and the lower component or base 40 has a largest outer perimeter that would be generally equivalent to the very bottom of the sloping outer surfaces 49. Referring to FIGS. 2, 3, and 4, the largest outer perimeter of the upper component or tray 20 is made to be at least smaller than and entirely surrounded by the largest outer perimeter of the lower component or base 40. The largest outer perimeters of the upper component 20 and the lower component 40 are made or designed in this manner so that when the apparatus 10 is placed on a ground surface 80 near a vertical surface or wall 70, then, as shown in FIG. 4, the upper component 20 will be prevented and not in any way be in contact with the vertical surface or wall 70 and insects would not be able to access the upper component 20 via crawling onto the vertical surface or wall 70. However, the apparatus 10 is not limited to achieving this function with the use of largest outer perimeters of the upper component 20 and lower component 40, and any suitable design or manner that aids in preventing the upper component 20 from being in contact with a vertical surface or wall may be utilized for carrying out the purpose of the present invention.

The liquid retaining or reservoir area 42 can be made to have a large capacity for holding a relatively large quantity of liquid or fluid 43 by providing a larger lower component 40 having a larger or deeper retaining or reservoir area 42. A large capacity retaining or reservoir area 42 is desired since it can hold a large amount of liquid or fluid 43 and it does not have to be re-filled as periodically or frequently.

FIGS. 2, 3, and 4 show apparatus 10 with the attached upper component 20, support component 30, and lower component 40. FIGS. 1, 2, 4 and 5 further show that the lower component 40 has handles 50 at its sides. A person would be able to use these handles 50 to more easily lift or move the entire apparatus 10 to a desired location. FIGS. 1, 2, 4, and 5 show that the handles 50 each have a lip shaped portion that protrude from the sides of the lower component 50, and the lip shaped portion surrounds an opening 51 for allowing a person's hand to be inserted therein so that the person can more easily lift or move the apparatus. However, the apparatus 10 is not in any way limited to the handles 50, and any suitable handles that allow a person to more easily lift or move the apparatus 10 may be utilized for carrying out the purpose of the present invention.

Figure 5:
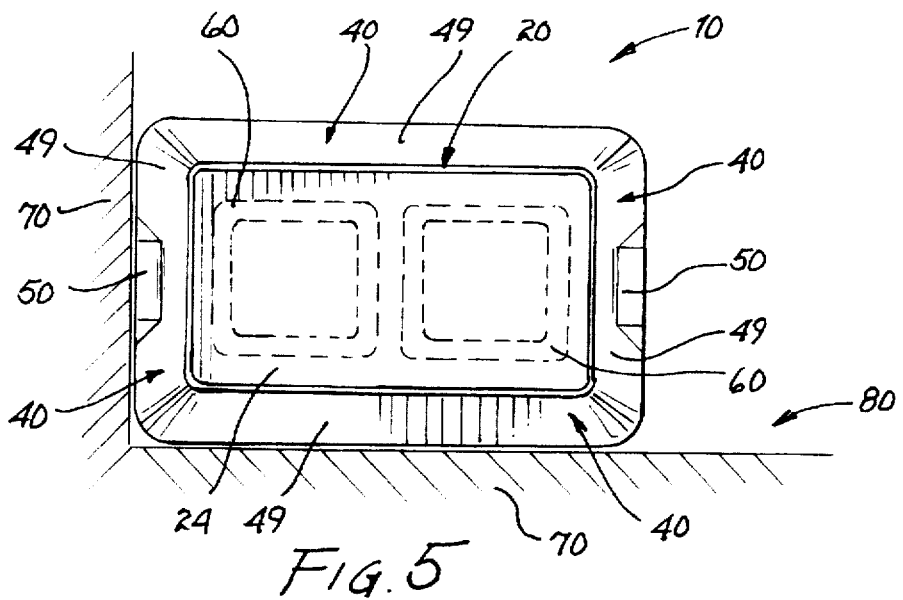
FIG. 5 Top view of the preferred embodiment apparatus for preventing insects from accessing at least one animal feeding container of FIG. 1 wherein the apparatus is shown on a ground surface and near a vertical surface.

The apparatus 10 with its attached upper component 20, support component 30, and the lower component 40 is placed on a ground surface 80 as shown in FIGS. 4 and 5. The apparatus 10 in FIGS. 4 and 5 is shown to be near a vertical surface or wall 70. An animal feeding container(s) 60 is/are retained within and placed on the upper component or tray 20 at its bottom surface 24. The retaining lip 28 retains and prevents the feeding container(s) from sliding off the edge of the upper component or tray 20. Furthermore, a non-skid mat can be placed on top of the bottom surface 24 so that the feeding container(s) 60 does/do not slide or move a round within the upper component or tray 20, especially if the apparatus 10 is moved, bumped, kicked, etc. The retaining or reservoir area 42 is filled with liquid or fluid 43, and the liquid or fluid 43 can either be filled through the filler opening 22 by allowing the liquid or fluid 43 to flow from above the upper component or tray 20, through the opening 22, and into the retaining or reservoir area 42 or, alternatively, by first removing the upper component 20 from the support component 20 and directly filling the liquid or fluid 43 into the retaining or reservoir area 42. The lower component 40 functions as a moat to prevent insects from accessing the upper component 20 and the feeding container (s) placed thereon, and the apparatus 10 is designed or made so that the upper component 20 will not come into contact with a vertical surface or wall 70 which would also possibly allow insects to access the upper component 20 and feeding container(s) placed thereon.

Therefore, apparatus 10 provides a device that is adapted to receive presently existing conventional animal feeding container(s) (i.e. dishes, bowls, etc.). Apparatus 10 also has the splash guard lip 46 that helps prevent splashing or spilling of liquid out of the retaining or reservoir area 42, especially if the apparatus 10 is moved, bumped, kicked, etc. Apparatus 10 has the further feature of preventing the upper component 20 holding the feeding container(s) 60 from contacting a vertical surface or wall 70 so that insects are not able to access the upper component 20 via crawling on the vertical surface or wall 70. Additionally, apparatus 10 can be made to have a relatively large retaining or reservoir area 42 so that it does not have to be re-filled as periodically or frequently. Furthermore, apparatus 10 has a non-skid mat placed on top of the bottom surface 24 of upper component 20 so that the feeding container(s) 60 does not slide or move around within the upper component or tray 20, especially if the apparatus 10 is moved, bumped, kicked, etc.

The foregoing description and specifications of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus, in combination with and for preventing insects from accessing at least one animal feeding container comprising:
    an upper component having a surface area which receives and supports the at least one animal feeding container,
    a support component having a top end and a bottom end wherein the top end of the support component is attached to the upper component, and
    a lower component attached to the bottom end of the support component wherein the lower component has at least a retaining area for holding a liquid that prevents insects from accessing the upper component and the at least one animal feeding container supported by the at upper component.

2. The apparatus for preventing insects from accessing the at least one animal feeding container according to claim 1 wherein the support component is a support column having a top end and a bottom end wherein the top end of the support column is attached to the upper component.

3. The apparatus for preventing insects from accessing the at least one animal feeding container according to claim 1 wherein the lower component is a base attached to the bottom end of the support component wherein the base has at least a retaining area for holding a liquid that prevent insects from accessing the upper component and the at least one animal feeding container supported by the upper component.

4. The apparatus for preventing insects from accessing the at least one animal feeding container according to claim 1 wherein the upper component is a tray that receives and supports the at least one animal feeding container.

5. The apparatus for preventing insects from accessing the at least one animal feeding container according to claim 1 wherein the upper component further comprises a filler opening for allowing liquid to be filled from the upper component to the retaining area of the lower component.

6. The apparatus for preventing insects from accessing the at least one animal feeding container according to claim 1 wherein the upper component further comprises a non-skid mat that is located on a top side of the upper component for preventing movement or sliding of the at least one animal feeding container that is received and supported by the upper component.

7. The apparatus for preventing insects from accessing the at least one animal feeding container according to claim 1 wherein the upper component further comprises a lip retaining area located on a bottom side of the upper component for receiving and holding the top end of the support component so that the support component further supports the upper component.

8. The apparatus for preventing insects from accessing the at least one animal feeding container according to claim 1 wherein the lower component is integrally attached to the bottom end of the support component.

9. The apparatus for preventing insects from accessing the at least one animal feeding container according to claim 1 wherein the support component is attached at a general central location of the retaining area of the lower component.

10. The apparatus for preventing insects from accessing the at least one animal feeding container according to claim 1 wherein the lower component further comprises a splash guard lip located around a perimeter of a top portion of the retaining area of the lower component to help prevent liquid from splashing out of the retaining area when the apparatus is moved or transported.

11. The apparatus for preventing insects from accessing the at least one animal feeding container according to claim 1 wherein the lower component further comprises handles located at sides of the lower component for allowing the apparatus to be more easily moved or transported.

12. The apparatus for preventing insects from accessing the at least one animal feeding container according to claim 11 wherein the handles each have an outwardly lip shaped portion that protrude from the sides of the lower component and that surrounds an opening for allowing the hand of a user to be inserted therein so that the apparatus is easily lifted.

13. The apparatus for preventing insects from accessing the at least one animal feeding container according to claim 1 wherein the retaining area has a large capacity for holding a relatively large quantity of liquid.

14. The apparatus for preventing insects from accessing the at least one animal feeding container according to claim 1 wherein the upper component has a largest outer perimeter and the lower component has a largest outer perimeter and wherein the largest outer perimeter of the upper component is at least smaller than and entirely surrounded by the largest outer perimeter of the lower component so that the upper component is prevented from contacting vertical surfaces when the apparatus is placed on a ground surface near vertical surfaces.

15. A method of making apparatus which prevents insects from accessing at least one animal feeding container comprising the steps of:
    providing an upper component having a surface area which receives and supports the at least one animal feeding container,
    attaching a top end of a support component to the upper component, and
    attaching a bottom end of the support component to a lower component having at least a retaining area for holding a liquid that prevent insects from accessing the upper component and the at least one animal feeding container supported by the upper component.

16. The method of making an apparatus for preventing insects from accessing the at least one animal feeding container according to claim 15 wherein the step of providing an upper component adapted to receive and support the at least one animal feeding container further comprises the step of:

providing a filler opening in the upper component for allowing liquid to be filled from the upper component to the retaining area of the lower component.

17. The method of making an apparatus for preventing insects from accessing the at least one animal feeding container according to claim 15 further comprising the step of:

placing a non-skid mat on a top side of the upper comoponent for preventing movement or sliding of the at least one animal feeding container that is received and supported by the upper component.

18. The method of making an apparatus for preventing insects from accessing the at least one animal feeding container according to claim 15 further comprising the step of:

providing a lip retaining area on a bottom side of the upper component for receiving and holding the top end of the support component so that the support component further supports the upper component.

19. The method of making an apparatus for preventing insects from accessing the at least one animal feeding container according to claim 15 wherein the step of attaching the bottom end of the support component to the lower component further comprises the step of:

integrally attaching the bottom end of the support component to the lower component having at least a retaining area for holding a liquid that prevents insects from accessing the upper component and the at least one animal feeding container supported by the upper component.

20. The method of making an apparatus for preventing insects from accessing the at least one animal feeding container according to claim 15 wherein the step of attaching the bottom end of the support component to the lower component further comprises the step of:

attaching the support component at a general central location of the retaining area of the lower component.

21. The method of making an apparatus for preventing insects from accessing the at least one animal feeding container according to claim 15 further comprising the step of:

locating a splash guard lip around a perimeter of a top portion of the retaining area of the lower component to help prevent liquid from splashing out of the retaining area when the apparatus is moved or transported.

22. The method of making an apparatus for preventing insects from accessing the at least one animal feeding container according to claim 15 further comprising the step of:

providing handles at sides of the lower component for allowing the apparatus to be more easily moved or transported.

23. The method of making an apparatus for preventing insects from accessing the at least one animal feeding container according to claim 15 further comprising the step of:

providing an upper component with a largest outer perimeter that is at least smaller than and entirely surrounded by a largest outer perimeter of the lower component so that the upper component is prevented from contacting vertical surfaces when the apparatus is placed on a ground surface near vertical surfaces.

24. A method of using apparatus which prevents insects from accessing at least one animal feeding container comprising the steps of:

providing the apparatus with an upper component having a surface area adapted to receive and support the at least one animal feeding container, a support component having a top end and a bottom end wherein the top end of the support component is attached to the upper component, and a lower component is attached to the bottom end of the support component wherein the lower component has at least a retaining area, placing the at least one animal feeding container on the surface area of the upper component, and filling liquid into the retainer area of the lower component so that insects are prevented from accessing the upper component and the at least one animal feeding container supported by the upper component.

* * * * *